US008494826B2

(12) United States Patent
Richards et al.

(10) Patent No.: US 8,494,826 B2
(45) Date of Patent: Jul. 23, 2013

(54) SYSTEMS AND METHODS FOR ANALYZING EQUIPMENT FAILURES AND MAINTENANCE SCHEDULES

(75) Inventors: Wynn G. Richards, Norman, OK (US); Kurt D. Martin, Norman, OK (US); William L. Lieurance, Norman, OK (US); Melvin M. Kosler, Norman, OK (US)

(73) Assignee: The United States Postal Service, Washington, DC (US)

( * ) Notice: Subject to any disclaimer, the term of this patent is extended or adjusted under 35 U.S.C. 154(b) by 719 days.

(21) Appl. No.: 12/687,016

(22) Filed: Jan. 13, 2010

(65) Prior Publication Data

US 2011/0172973 A1  Jul. 14, 2011

(51) Int. Cl.
*G06G 7/48*  (2006.01)
(52) U.S. Cl.
USPC .......................................................... 703/7
(58) Field of Classification Search
USPC .......................................................... 703/7
See application file for complete search history.

(56) References Cited

U.S. PATENT DOCUMENTS

| 5,566,092 | A  | * | 10/1996 | Wang et al. | 702/185 |
| 7,844,433 | B2 | * | 11/2010 | Masuda et al. | 703/13 |
| 2002/0174384 | A1 | * | 11/2002 | Graichen et al. | 714/37 |
| 2004/0223009 | A1 | * | 11/2004 | Szladovics et al. | 345/760 |
| 2005/0007249 | A1 |   | 1/2005 | Eryurek et al. | |
| 2005/0177353 | A1 | * | 8/2005 | Slater | 703/6 |
| 2005/0246629 | A1 |   | 11/2005 | Hu | |
| 2006/0253466 | A1 | * | 11/2006 | Upton, IV | 707/100 |
| 2007/0061049 | A1 | * | 3/2007 | Masuda et al. | 700/291 |
| 2010/0043074 | A1 | * | 2/2010 | Scates | 726/25 |

OTHER PUBLICATIONS

International Search Report from PCT/US2011/021186, dated Apr. 11, 2011.

* cited by examiner

*Primary Examiner* — Dwin M Craig
(74) *Attorney, Agent, or Firm* — Knobbe Martens Olson & Bear LLP

(57) ABSTRACT

A computer implemented method may be used for analyzing equipment failures and maintenance schedules. An equipment maintenance system generates a model of equipment and components of each piece of equipment. In one embodiment, the model is a tree representation. The equipment maintenance system may then determine estimated failure information for each component based on a selected statistical model. The equipment maintenance system may also generate a maintenance schedule based on the determined estimated failure information for each component of the equipment. In one embodiment, the equipment maintenance system displays the equipment maintenance information.

30 Claims, 16 Drawing Sheets

SYSTEMS AND METHODS FOR ANALYZING EQUIPMENT FAILURES AND MAINTENANCE SCHEDULES

BACKGROUND OF THE INVENTION

1. Field of the Invention

The developed embodiments relate to systems and methods for estimating equipment failure information.

2. Description of the Related Art

Complex equipment systems require the use of many pieces of equipment with each piece of equipment containing multiple individual components. Each of the pieces of equipment and the individual components of each piece of equipment may have different maintenance costs, schedules, time to failure, and other maintenance characteristics. In addition, the maintenance characteristics may change as new types of equipment are added to the manufacturing system. Therefore, it is desirable to have systems and methods for efficiently estimating maintenance characteristics in a complex equipment environment. It is also advantageous to have systems and methods that display or otherwise communicate estimated maintenance characteristics in a user friendly manner.

SUMMARY OF THE INVENTION

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include efficiently tracking and estimating equipment failure information.

In one embodiment, a computer-implemented method for displaying equipment failure estimation information comprises receiving information relating to maintenance of a plurality of components of at least one item of equipment, generating display data indicative of a tree representation of the components, receiving data indicative of a selection of a portion of the tree representation, receiving an assignment of a statistical model to at least one of the components corresponding to the selected portion of the tree representation, and estimating equipment maintenance information associated with at least the selected portion of the components based on the assigned statistical model. Other embodiments include systems configured to perform the method and to generate and display equipment data.

BRIEF DESCRIPTION OF THE DRAWINGS

FIG. 14 is a screen shot illustrating one embodiment of a user interface for displaying equipment maintenance information.

FIG. 15 is a screen shot illustrating one embodiment of a user interface for displaying equipment maintenance information.

DETAILED DESCRIPTION OF THE PREFERRED EMBODIMENT

The following detailed description is directed to certain specific embodiments of the invention. However, the invention can be embodied in a multitude of different ways as defined and covered by the claims. In this description, reference is made to the drawings wherein like parts are designated with like numerals throughout.

Many types of complex equipment require regular maintenance both to replace or repair worn out parts and to prophylactically repair or replace components prior to failures during service. Different components of a particular piece of equipment may fail or otherwise need to be replaced depending on different factors and in equipment specific ways. Therefore, it can be complicated to determine when maintenance or replacement is needed for each individual component of the system. Empirically determining anticipated maintenance information requires the use of statistical methods, but implementing statistical methods in an ad-hoc manner, such as using a large spreadsheet, is cumbersome and inefficient. An equipment family tree or other equipment model may be drawn manually to identify and locate relationships and components of large scale machinery. However, such trees may need to be drawn and redrawn many times in order to keep up with the changes during equipment deployment due to new and updated equipment.

A computer implemented equipment maintenance system allows for a more accurate, detailed, and efficiently prepared analysis. An equipment maintenance system may perform a variety of determinations, such as analysis on total estimated life cycle cost of a particular piece of equipment as well as analysis of the cost, maintenance times, and estimated life cycle of individual components of a piece of equipment. The equipment maintenance system may also create an equipment maintenance model and generate an interface for allowing a user to easily view important maintenance information.

Figure 1:
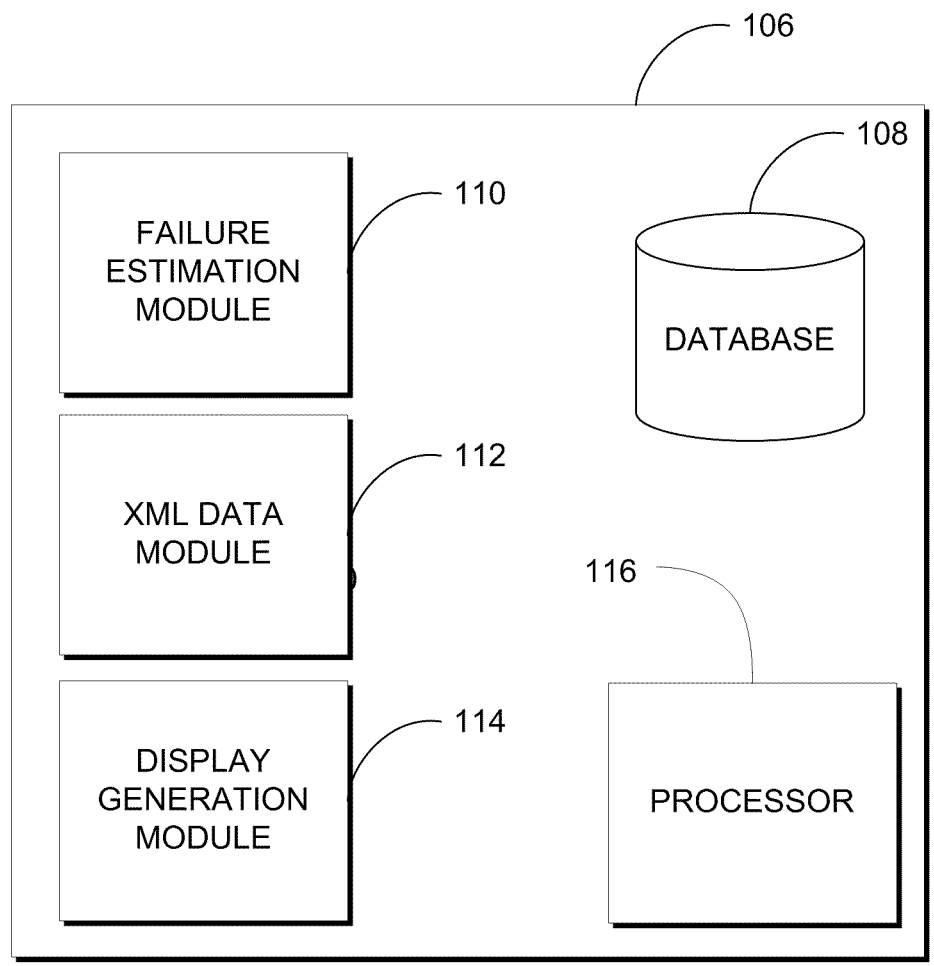
FIG. 1 is a block diagram illustrating one embodiment of an equipment maintenance estimation system.

FIG. 1 is a block diagram illustrating one embodiment of an equipment maintenance system 106. The equipment maintenance system 106 may contain a processor 116, a database 108, a failure estimation module 110, an XML data module 112, and a display generation module 114. However, the equipment maintenance system 106 is not limited to the modules shown in FIG. 1. The database 108 optionally stores information about equipment. The database 108 may be any type of suitable data storage. For example, the database 108 may be a relational database, a flat text file, or an XML file.

The XML data module 112 may receive XML data or other data formats and transform the received data into data suitable for storage in the database 108 and suitable for use by the other modules. The failure estimation module 110 uses the data in the database 108 in order to create a model of the equipment, apply statistical methods to the model, and estimate equipment maintenance information based on the applied statistical methods. The display generation module 114 displays a user interface for displaying the equipment model and estimated maintenance information to the user. The display generation module 114 may also generate an interface for receiving user input. The equipment maintenance system 106 is not limited to any particular computing environment. For example, the equipment maintenance system 106 may run in a single computer, client server environment, or a web 2.0 configuration.

The processor 116 may execute the instructions provided by the XML data module 112, failure estimation module 110, and display generation module 114. Any actions of the equipment maintenance system 106 herein may be executed by the processor 116.

Figure 2:
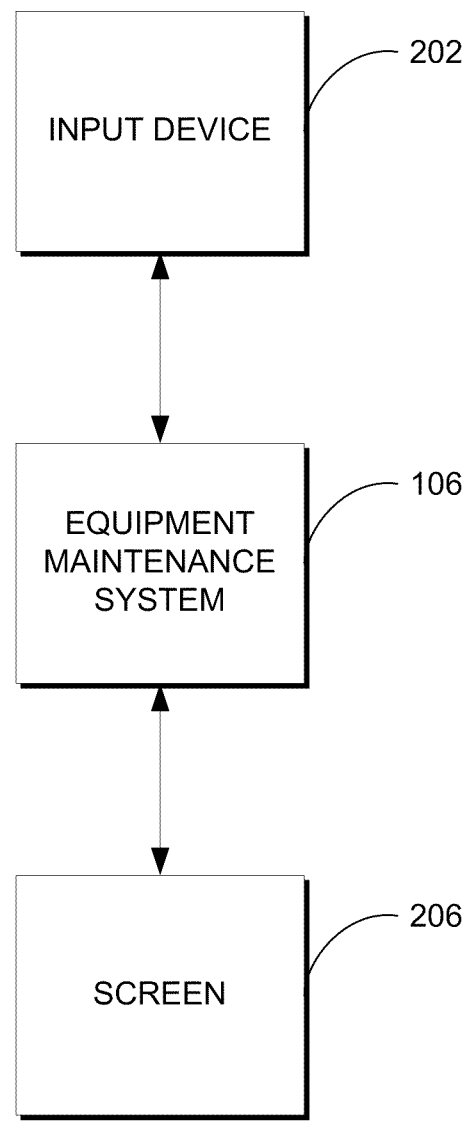
FIG. 2 is a block diagram illustrating one embodiment of an equipment maintenance estimation environment.

FIG. 2 is a block diagram illustrating one embodiment of an equipment maintenance environment. The equipment maintenance system 106, shown in FIG. 1, may be connected to an input device 202 and a screen 206 for display. The input device 202 may be, for example, a keyboard or mouse. The screen 206 may be computer monitor. The input device 202 and screen 206 may be remote from one another, such as when the equipment maintenance system 106 is run in a client server configuration. In one embodiment, the equipment maintenance system 106 produces information for displaying a user interface on the screen 206, and the equipment maintenance system 106 receives user input from the input device 202. In another embodiment, the equipment maintenance system 106 produces data indicative of a user interface, and the user interface is displayed on a remote device. For example, in one embodiment, the system 100 comprises a client/server type system in which components such as the display generation module 114 reside on the server and generate a user interface defined by one or more of HTML, XML, SVG, or other suitable formats. A client computer, which comprises the screen 206, receives the user interface data from the server and displays the user interface. In another embodiment, the display data is generated and displayed on a user's computer.

Figure 3:
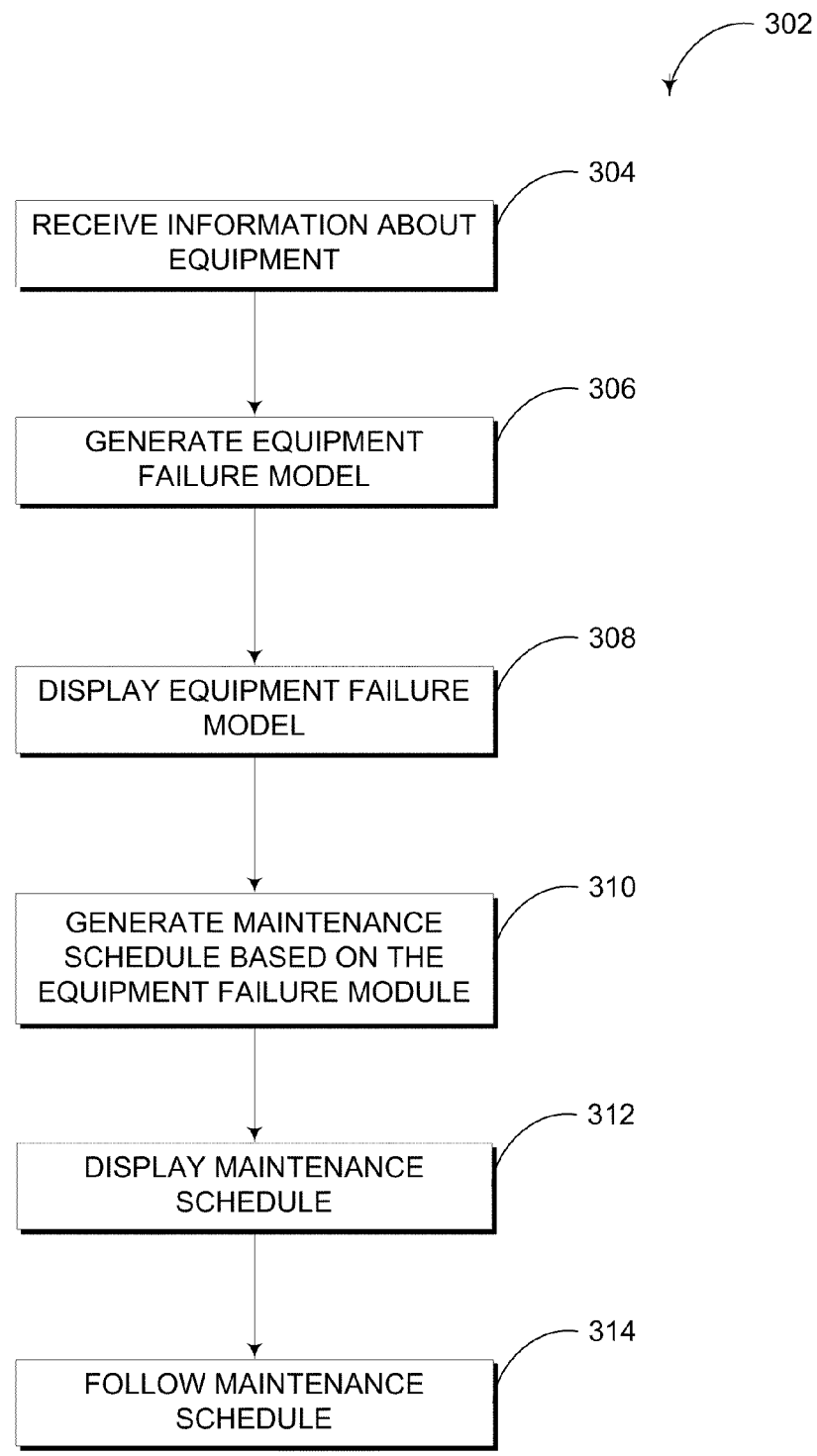
FIG. 3 is flow chart illustrating one embodiment of a method for scheduling equipment maintenance.

FIG. 3 is a flow chart illustrating one embodiment of a method 302 for using the equipment maintenance system 106 to schedule equipment maintenance. Beginning at a block 304, the equipment maintenance system 106 receives information about equipment. The information may be, for example, information about a piece of equipment and the component parts of the piece of equipment. Continuing to a block 306, the equipment maintenance system 106 generates an equipment failure model. The equipment failure model may determine, for example, the estimated time of failure of various components of the piece of equipment. Proceeding to a block 308, the equipment maintenance system 106 displays a user interface to display the equipment failure model. Moving to a block 310, the equipment maintenance system 106 generates a maintenance schedule based on the equipment failure model. The maintenance schedule may include information indicating things such as when to replace components of a piece of equipment or when to replace the entire piece of equipment. Continuing to a block 312, the equipment maintenance system 106 displays a user interface to display the maintenance schedule. Moving to a block 314, a user may follow the maintenance schedule after viewing the maintenance schedule generated by the equipment maintenance system 106. FIG. 3 represents a simplified representation of a high level process as it relates both to the equipment maintenance system 106 and the user. The details of blocks 304 and 306 are discussed in further detail in relation to FIG. 5 which discusses a method that may be executed by the equipment maintenance system 106.

Figure 4:
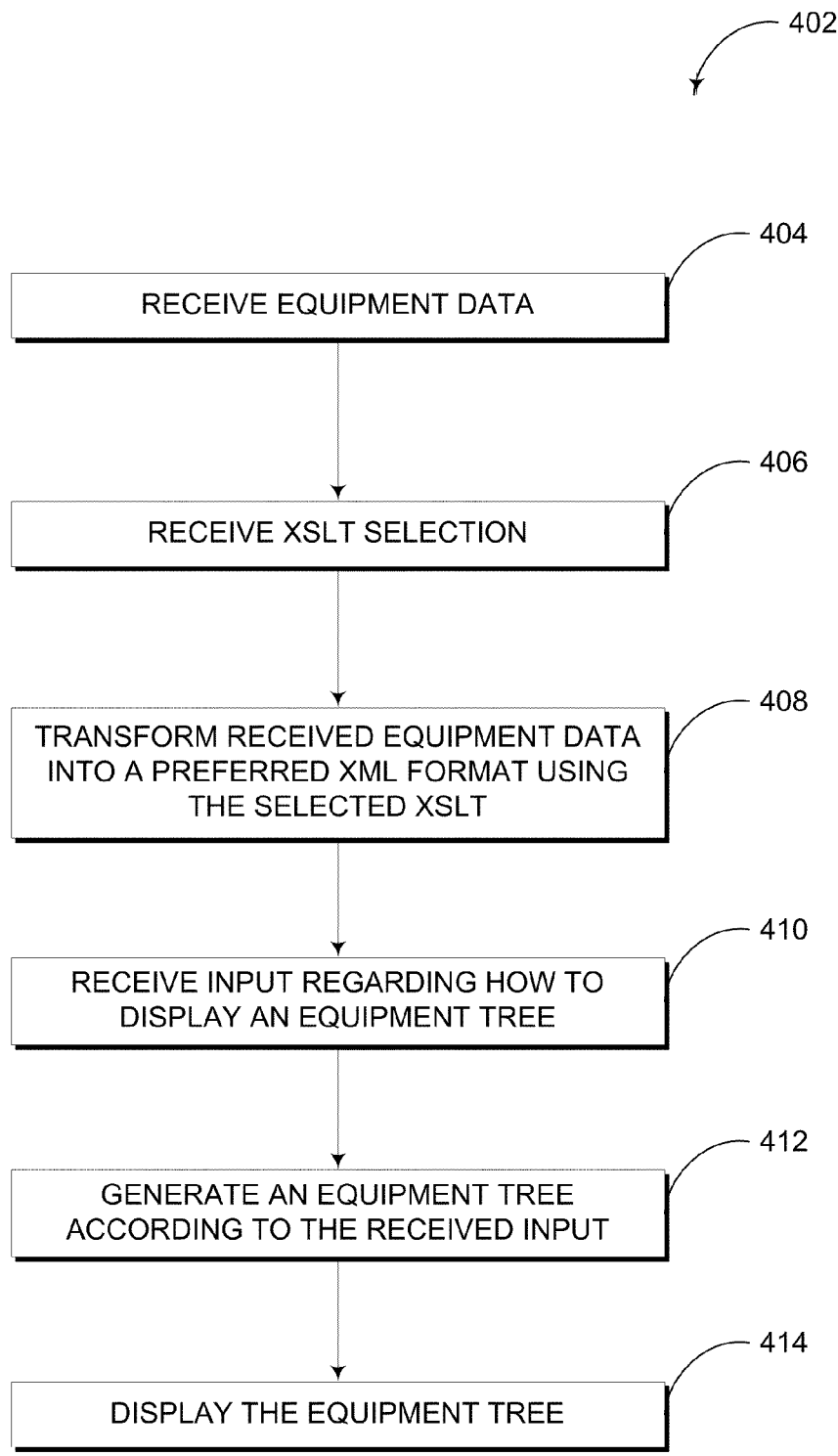
FIG. 4 is a flow chart illustrating a method 402 for transforming equipment data and displaying the data.

FIG. 4 is a flow chart illustrating a method 402 for transforming equipment data and displaying the data. The equipment maintenance system 106 may transform various types of data into data suitable for forming a tree structure. This allows entities to maintain their data in non-uniform ways and still input the data into the equipment maintenance system 106. The XML data may be transformed into a graphical format, such as Scalable Vector Graphics ("SVG").

Embodiments of the method 402 have many possible applications. For example, the method 402 may be used to create an equipment tree used for displaying information about equipment maintenance. In another embodiment, the method 402 may be used in technical manuals to display an entire system of equipment. The display of an equipment family tree is an integral part of technical documentation used in manufacturing industries, government and military. The method 402 can dynamically update the equipment tree each time a new input file is used. In contrast, using a manual system would require a time consuming process to update the tree each time a piece of equipment is added or removed, particularly if the alteration is at a high level in the tree. In one embodiment, the method 402 is used in the United States Postal Service's Dendron application.

Figure 6:
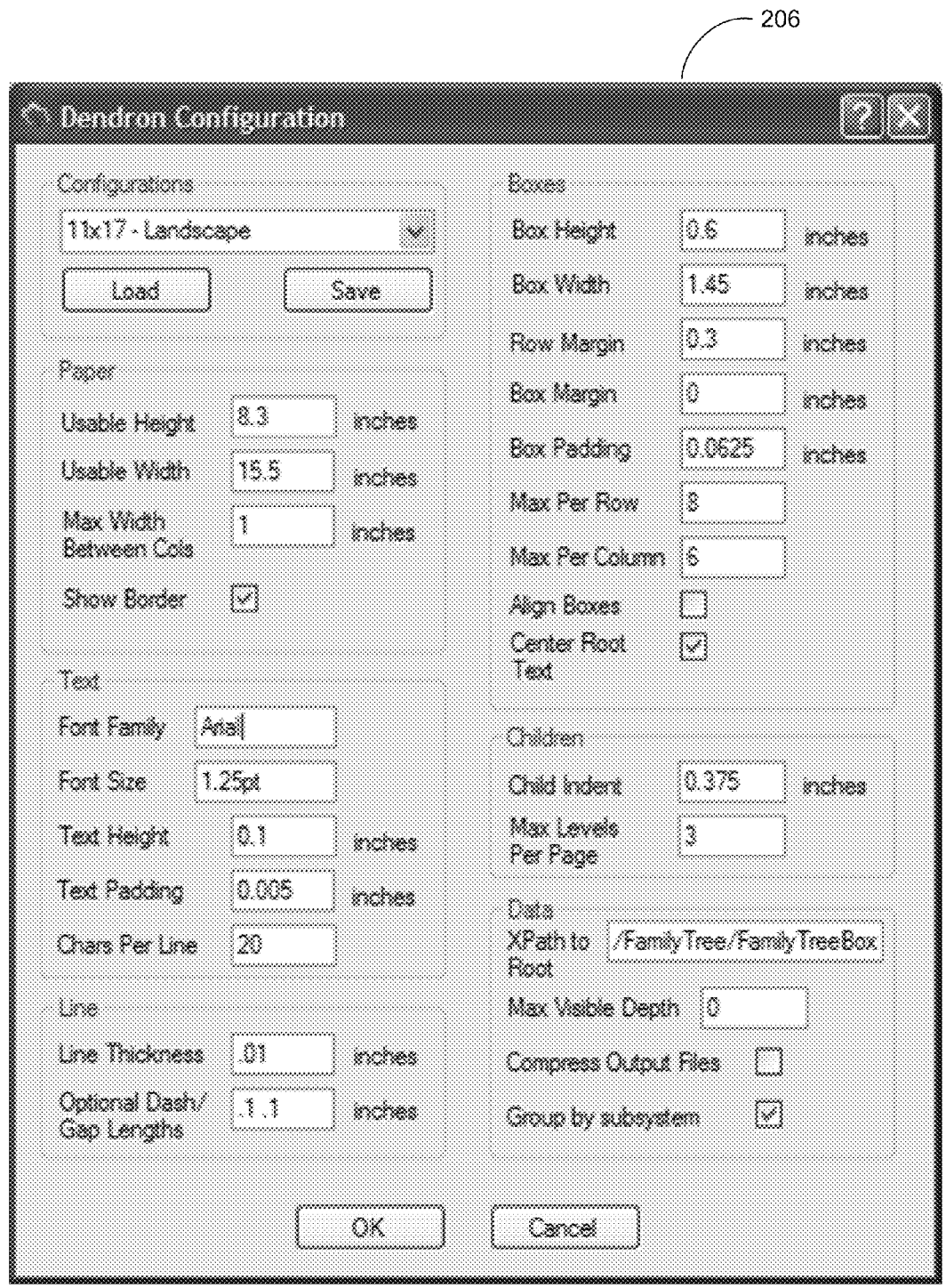
FIG. 6 is a screen shot displaying one embodiment of a user interface for receiving input regarding how to display the equipment family tree.

Beginning at a block 404, the equipment maintenance system 106 receives equipment data. The equipment data may be in any format. In one embodiment, the data is in an XML format. In one embodiment, the data is received in another data format. For example, the data may be stored in a relational database, such as Microsoft Excel® or Microsoft Access®. In one embodiment, the data received is from the United States Postal Service's Bill of Materials Database. The equipment maintenance system 106 may first convert the received data into XML data. In one embodiment, the equipment maintenance system 106 displays a user interface for receiving the equipment data. Continuing to a block 406, the equipment maintenance system 106 receives an XSLT selection. In one embodiment, the equipment maintenance system 106 displays a user interface for displaying XSLT options. In another embodiment, the equipment maintenance system 106 displays a user interface that allows a user to upload an XSLT. FIG. 6 discussed below illustrates a screen shot showing an example of a user interface for receiving information about XML data and information about an XSLT. Moving to a block 408, the equipment maintenance system 106 transforms the received equipment data into a preferred XML format using the selected XSLT. The transformation may be done using any suitable method known in the art.

Proceeding to a block 410, the equipment maintenance system 106 receives input regarding how to display an equipment tree. For example, FIG. 7 discussed below illustrates a screen shot of a user interface that may be used to receive input about how to display an equipment tree.

Moving to a block 412, the equipment maintenance system 106 generates an equipment tree according to the received input. For example, the equipment tree may have a piece of equipment with the components of the equipment as child tree nodes. The equipment maintenance system 106 may use the transformed XML data and the received information about how to display the tree. In one embodiment, the equipment tree may be generated using SVG. SVG is desirable because it allows paging and linking, and it is conducive to both web and print display. In one embodiment, generating the equipment tree requires traversing the tree and creating the equipment tree according to the user input about the equipment tree display variables.

Continuing to a block 414, the equipment maintenance system 106 displays the equipment tree. The equipment maintenance system 106 may display the equipment tree in a print or web output. In another embodiment, the equipment maintenance system 106 exports the equipment tree to another data format. SVG can be displayed in multiple sheets with hyper links allowing the equipment maintenance system 106 to receive a user selection of a portion of a tree and to display a sub-tree of the selected portion on a new page. The equipment maintenance system 106 may output multiple files, each containing a portion of the equipment tree. In one embodiment, the equipment maintenance system 106 exports the equipment tree rather than displaying it.

Figure 5:
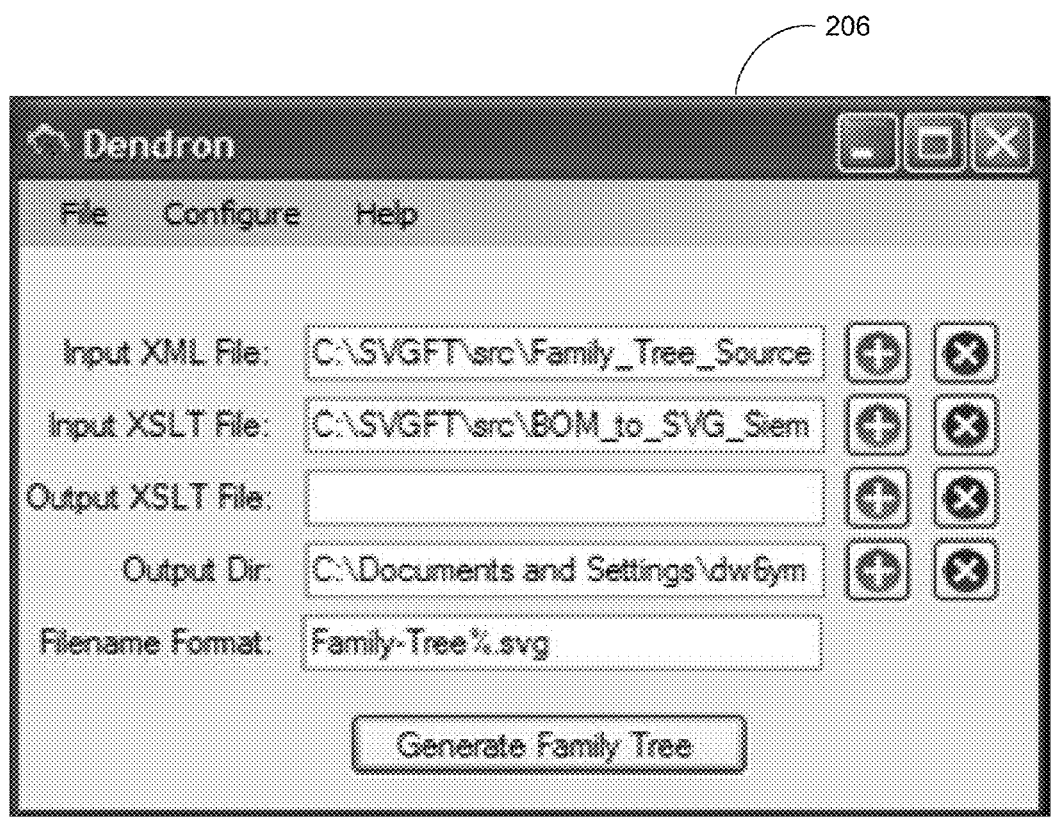
FIG. 5 is a screen shot displaying one embodiment of a user interface for receiving information about XML data and information about an XSLT.

FIG. 5 is a screen shot displaying one embodiment of a user interface for receiving information about XML data and information about an XSLT. The interface allows a user to select an input XML file, an input XSLT file, an output XSLT file, an output directory, and a filename format.

FIG. 6 is a screen shot displaying one embodiment of a user interface for receiving input regarding how to display the equipment tree. The user interface may receive information about any type of display variable, such as paper space, paper size, maximum tree level, height and width for each item, maximum visible tree depth, font, size, starting point (tree node), width and height for each box within the tree, and margins. In one embodiment, the user interface allows the user to create his own 'named' paper size for later use. In one embodiment, the user interface receives information about the maximum or minimum boxes (tree nodes) to display across or down a page, and the equipment maintenance system 106 determines whether the user set option violates any preceding rules. In another embodiment, the user interface receives input about a setting as to whether to use a dashed line for optional equipment. The interface may receive options for other display variables as well.

Figure 7:
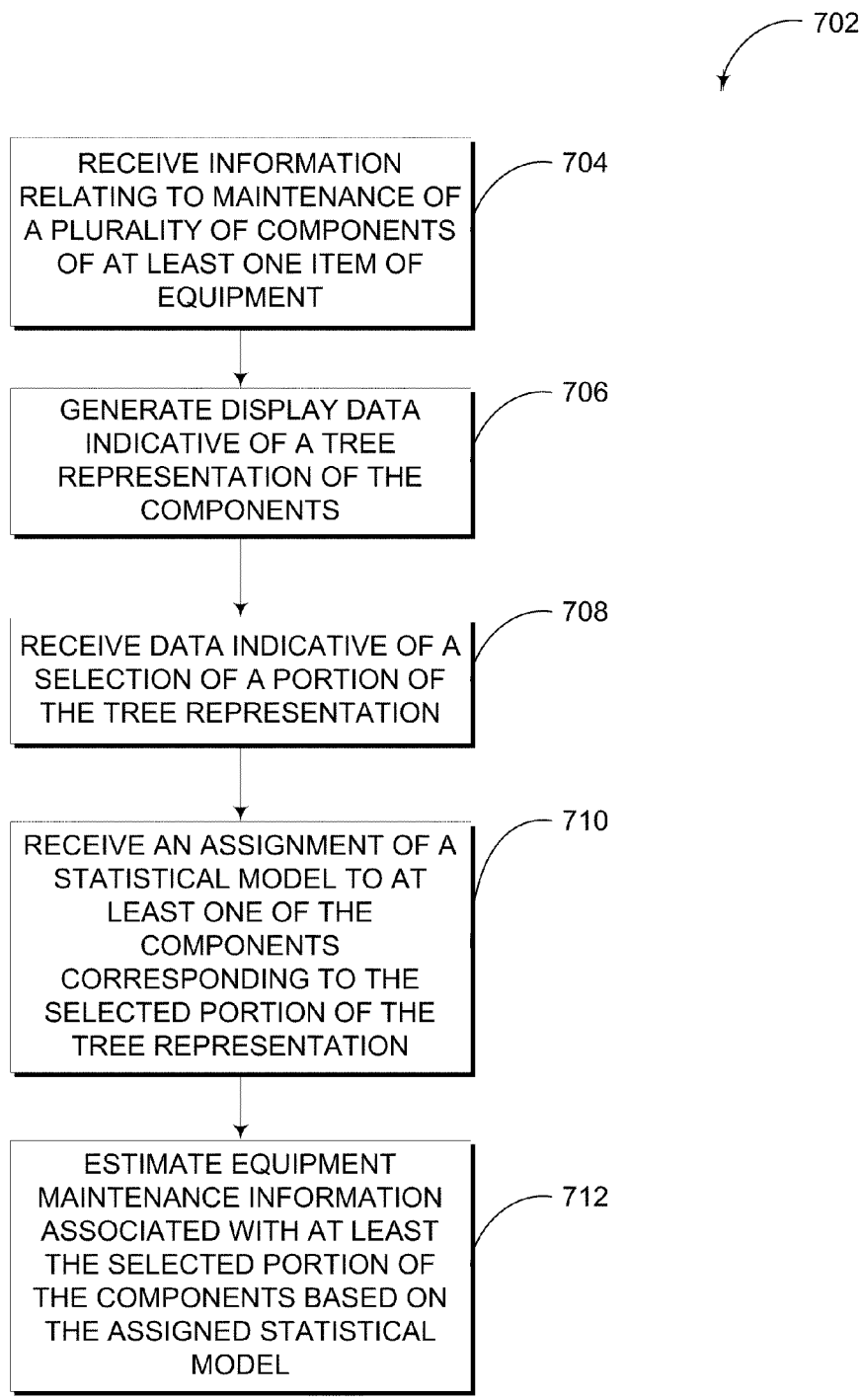
FIG. 7 is a flow chart illustrating one embodiment of a method for estimating equipment failure information.

FIG. 7 is a flow chart illustrating one embodiment of a method 702 for estimating equipment failure information. Beginning at a block 704, the equipment maintenance system 106 receives information relating to maintenance of a plurality of components of at least one item of equipment. The information may be received in any format. The information may be received, for example, from user input from the input device 202, from a remote database, or from the database 108. In one embodiment, the equipment maintenance system 106 first transforms the received data into a format more suitable for the equipment maintenance system 106, for example, using the method 402 as discussed in more detail previously in reference to FIG. 4. In one embodiment, the received data is transformed into a particular XML format. In another embodiment, the data is transformed into a particular XML format prior to being received by the equipment maintenance system 106. The received information may include hierarchical information about equipment, such as a list of equipment and its components as well as individual components of the components. In one embodiment, the equipment maintenance system 106 displays a user interface for display on the screen 206 which requests information about equipment and its component parts. The equipment maintenance system 106 may then receive information about the equipment and its components parts from input device 202.

Table 1 below shows the fields that may be used for the transformed XML data. The first three columns display the hierarchal format of the data, such that column 2 shows the sub-elements of column 1 and column 3 shows the sub-elements of column 2. For example, the service life element includes sub-elements for clock hours, run hours, cycles, pieces processed, and containers processed. Table 1 is only an example of a possible data format, and other XML fields may be used.

TABLE 1

| System Data Elements | | | Description |
|---|---|---|---|
| Scheduled Events | | | number of events that were triggered by prediction, inspection or mandatory change |
| Unscheduled Events | | | number of events triggered when the service life expires before mandatory change or inspection |
| Scheduled Work Hours | | | the number of work-hours expended on scheduled events |
| Unscheduled Work Hours | | | the number of work hours expended on non-scheduled events |
| Material Cost | | | the cumulative cost of parts and materials |
| Reference Designator | | | unique component identifier -specific to part number and specific location within system |
| NSN | | | national stock number |
| OEM | | | original equipment manufacturer (part number) |
| Nomenclature | | | part name |
| Description | | | comment |
| Service Life | | | register - the predicted service life of the reference designator currently in service in the simulator |
| | clock hours (Calendar Days) | | service life will be measured in one of several available units of measure from one of several system counters |
| | run hours | | |
| | cycles | | |
| | pieces processed | | |
| | containers processed | | |

TABLE 1-continued

| System Data Elements | | | Description |
|---|---|---|---|
| Failure Distribution Curve | | | the failure distribution profile of a population of this specific component type. Flat for electronics, normal distribution curve for mechanical parts |
| Minimum Service Life | | | the minimum expected service life of this component |
| Maximum Service Life | | | the maximum expected service life of this component |
| MTBF | | | mean time between failure - provided through reliability analysis deliverable |
| | clock hours | | |
| | run hours | | |
| | cycles | | |
| | pieces processed | | |
| | containers processed | | |
| MTTR | | | Mean Time to Repair - provided through maintainability analysis |
| | Fault Isolation Time | | time required to isolate the fault to this component when it fails |
| | Configuration Time | | the time required to configure the replacement component for this specific location within the system |
| | Remove & Replace Time | | the time required to remove the failed part and install the replacement part |
| | Align and Adjust Time | | the time required to align and/or adjust the replacement component |
| | Software/Firmware Load | | the time required to upload software or firmware to the replacement component |
| | Validate Repair Time | | the time required to validate the replacement part is operating properly and that the system is restored to service |
| | post repair close-out time | | the time required to clean-up, store tools, etc. after service is complete |
| Minimum Skill Level | | | Minimum Skill level required to perform work |
| | | MPE | |
| | | ET | |
| Preventive Inspection | | | |
| | inspection time | | the time required to perform the PM inspection prescribed for this component |
| | Initial Interval | | the interval between installation of this component and the first inspection |
| | | clock hours | |
| | | run hours | |
| | | cycles | |
| | | pieces processed | |
| | | containers processed | |
| | Follow-up interval | | the interval between the first inspection and each subsequent inspection throughout the remaining service life of the component |
| | | clock hours | |
| | | run hours | |
| | | cycles | |
| | | pieces processed | |
| | | containers processed | |
| wear-in Inspection | | | one time inspection at a short interval after replacement to stabilize the new part |
| | inspection time | | time required for the wear-in inspection |
| | Align and Adjust Time | | mean time for wear-in adjustment |
| Routine Maintenance | | | recurring maintenance procedure |
| | Maintenance Procedure Time | | time to perform procedure |
| Predictable | | | if predictive technology is employed to sense or deduce that this component is showing signs that it will fail (degraded but not yet degraded enough to affect performance) |
| | MTTF | | mean time between realization that this component is going to fail and failure |

TABLE 1-continued

| System Data Elements | | | Description |
|---|---|---|---|
| Mandatory Change | | | this component is designated to be replaced at a fixed interval regardless of condition (performance nor remaining useful service life) |
| | Interval | | interval between installation of this component and replacement |
| | | clock hours run hours cycles pieces processed containers processed | |
| Collateral Damage | | | other components (if any) affected when the end of life of a component is unscheduled (runs to failure - breakdown) |
| | reference designator 1 | | first affected component |
| | reference designator 2 | | second affected component |
| | reference designator 3 | | third affected component |
| | reference designator 4 | | fourth affected component |
| Part Cost | | | the dollar value of this component |
| Servicing Materials Cost | | | the dollar value of materials expended while servicing this component |
| Cumulative Reference Designator Counter | | | during the simulation, accumulate the number of times this part is replaced |
| Cumulative Inspection Counter | | | during this simulation, accumulate the number of PM inspections (initial and follow-up) for this component |
| [x] array - daily scheduled work events | | | during sim, store for each day |
| [x] array - daily scheduled ET work events | | | during sim, store for each day |
| [x] array - daily scheduled MPE work hours | | | during sim, store for each day |
| [x] array - daily unscheduled events | | | during sim, store for each day |
| [x] array - daily unscheduled ET work hours | | | during sim, store for each day |
| [x] array - daily unscheduled MPE work hours | | | during sim, store for each day |
| [ref des] array run to failure event counter | | | during sim, count total for each reference designator |
| [ref des] array predictive event counter | | | during sim, count total for each reference designator |
| [ref des] array mandatory replacement event counter | | | during sim, count total for each reference designator |
| [ref des] array wear-in inspection event counter | | | during sim, count total for each reference designator |
| [ref des] array routine maintenance event counter | | | during sim, count total for each reference designator |
| [ref des] array PM inspection event counter | | | during sim, count total for each reference designator |
| [ref des] unused service life value | | | during sim, accumulate total for each reference designator |

Moving to a block 706, the equipment maintenance system 106 generates display data indicative of a tree representation of the components. For example, the XML data may be transformed into a graphical format, such as SVG. SVG is desirable because it may allow paging and linking, and it is conducive to both web and print display. In one embodiment, the equipment maintenance system 106 displays a user interface for receiving input regarding how to display the data. For example, the data may be displayed on the screen 206, and the options may be, for example, for paper space, paper size, maximum tree level, height and width for each item, maximum visible tree depth, font, size, and margins. The interface may receive options for other display variables as well. The equipment maintenance system 106 may then alter the data for display based on the options received from the interface. The data for display may then be displayed to a user. Block 706 is discussed hereinafter in more detail in relation to FIG. 8.

Continuing to a block 708, the equipment maintenance system 106 receives data indicative of a selection of a portion of the tree representation. For example, the entire tree, an element of the tree, multiple elements of the tree, or a sub-tree may be selected. In one embodiment, the data is user input received from input device 202. The selected portion of the tree representation may correspond to a portion of the components of the equipment represented by the tree representation. Block 708 is discussed hereinafter in more detail in relation to FIG. 9.

Proceeding to a block 710, the equipment maintenance system 106 receives an assignment of a statistical model to at least one of the components corresponding to the selected portion of the tree representation. The equipment maintenance system 106 may generate an interface for displaying statistical models and an interface for receiving a selection of one or more statistical models. The statistical model may be indicative of a rate of failure, such as a linear or exponential failure rate, for the particular portion of the equipment. In one embodiment, the equipment maintenance system 106 allows a different statistical model to be applied to different portions of a tree. For example, one statistical model may be assigned to one sub-tree and another statistical model may be assigned to another sub-tree indicating that one set of components may fail at one rate and another set of components may fail at another rate. The equipment maintenance system 106 may generate an interface for receiving other variables that may be used to calculate equipment failure information with further precision. The interface may also receive a cutoff point in a given statistical distribution, above which an event is assumed to occur. Block 710 is discussed hereinafter in more detail in relation to FIGS. 10 and 11.

Moving to a block 712, the equipment maintenance system 106 estimates equipment maintenance information associated with at least the selected portion of the components based on the assigned statistical model. In one embodiment, additional parameters are also used to determine the equipment maintenance information. The equipment maintenance information may include, for example, mean time to failure of the equipment, mean time to repair the equipment, maintenance cost of the equipment, or intervals for scheduled maintenance of the equipment. In one embodiment, the equipment maintenance system 106 generates a maintenance schedule for the equipment.

In one embodiment, the equipment maintenance system 106 then stores the estimated information in the database 108. For example, the equipment maintenance data may be stored in XML or relational format, and the equipment maintenance system 106 may export the data into another format. This allows the data to be used outside of the equipment maintenance system 106.

In one embodiment, the equipment maintenance system 106 then displays a user interface that displays the estimated maintenance information. The estimated maintenance information may be displayed in an SVG format, and the equipment maintenance system 106 may generate an interface for receiving options for the display format, such as options similar to those available for the display format of the tree representation. In one embodiment, separate display options may be input, respectively, for the tree representation and the estimation display. The equipment maintenance system 106 may allow the estimated information to be exported or printed. In one embodiment, the equipment maintenance system 106 displays a user interface for displaying the calculated future maintenance information as well as past maintenance efforts. The equipment maintenance system 106 may estimate maintenance information for selected portions of the tree or the entire tree. The maintenance information may also be displayed or exported for a portion of the tree or the entire equipment tree. Block 712 is discussed hereinafter in more detail in relation to FIG. 12.

Figure 8:
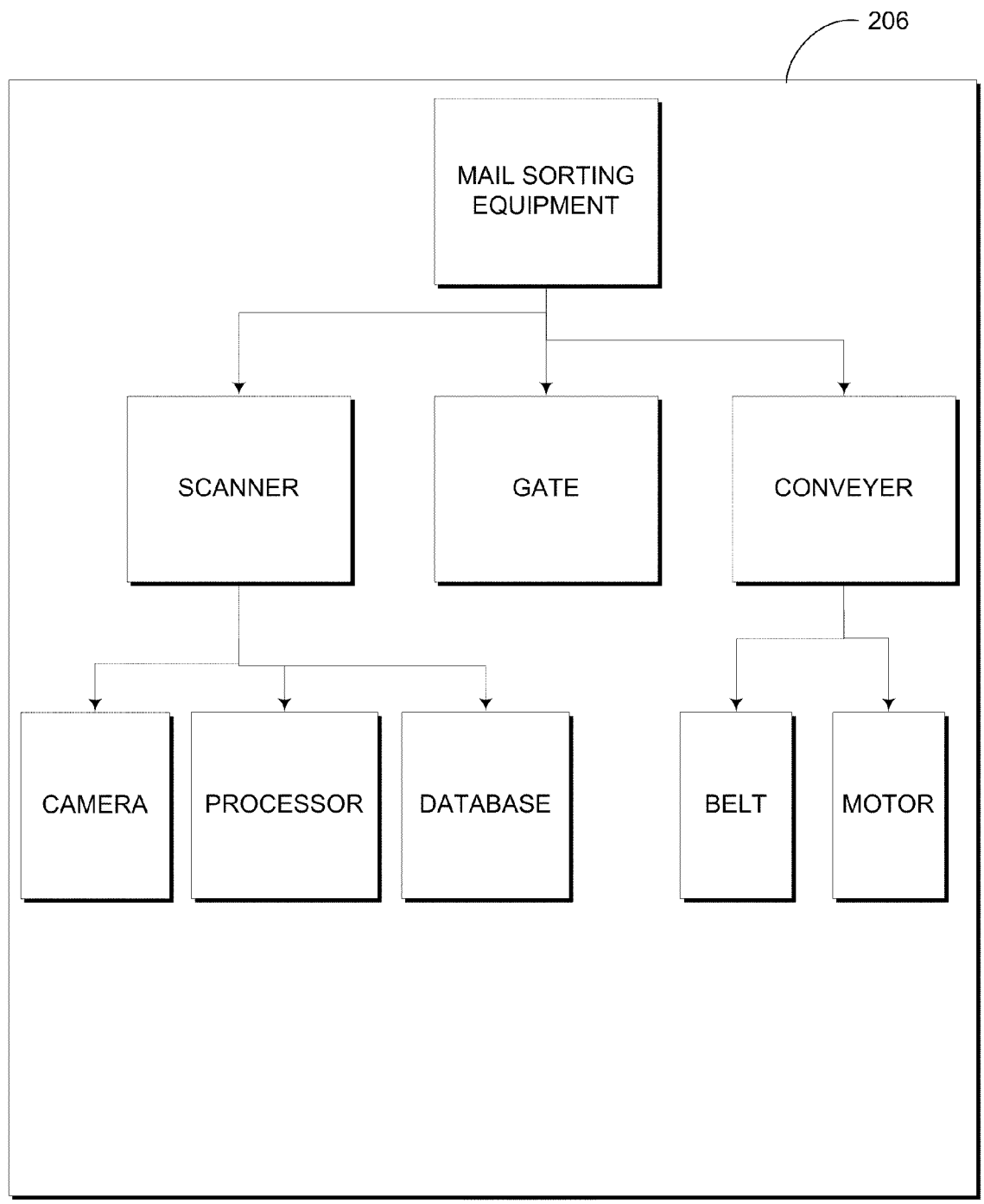
FIG. 8 is a screenshot of one embodiment of a user interface for displaying an equipment maintenance tree.

The equipment maintenance system 106 allows for new data to be easily incorporated into the system. For example, the equipment maintenance system 106 may receive XML data and convert it into a graphical SVG format. In one embodiment, the equipment maintenance system 106 includes emerging standards such as the Diagnostic Markup Language. In one embodiment, the equipment maintenance system 106 allows vendors to use information directly from a database, such as the United States Postal System's Bill of Materials database, and automatically generate an equipment model in a graphical format. In order to update the model, new data may simply be exported into the system, and an entirely new model may be quickly and automatically generated. For example, if changes are made to the database, the database information can be input into the equipment maintenance system 106, and a new equipment tree may be generated. In one embodiment, the new equipment tree is generated using the same algorithm that generated the initial equipment tree FIG. 8 is a screenshot of one embodiment of a user interface displayed in block 706 of FIG. 7 by an equipment estimation system 106 to be displayed on the screen 206. Screen 206 shows an equipment tree that represents the component parts of the equipment, which in this case is mail sorting equipment. The screen 206 shows that the mail sorting equipment includes a scanner, gate, and conveyer. The scanner's components include a camera, processor, and database, and the conveyer's components include a belt and motor.

Figure 9:
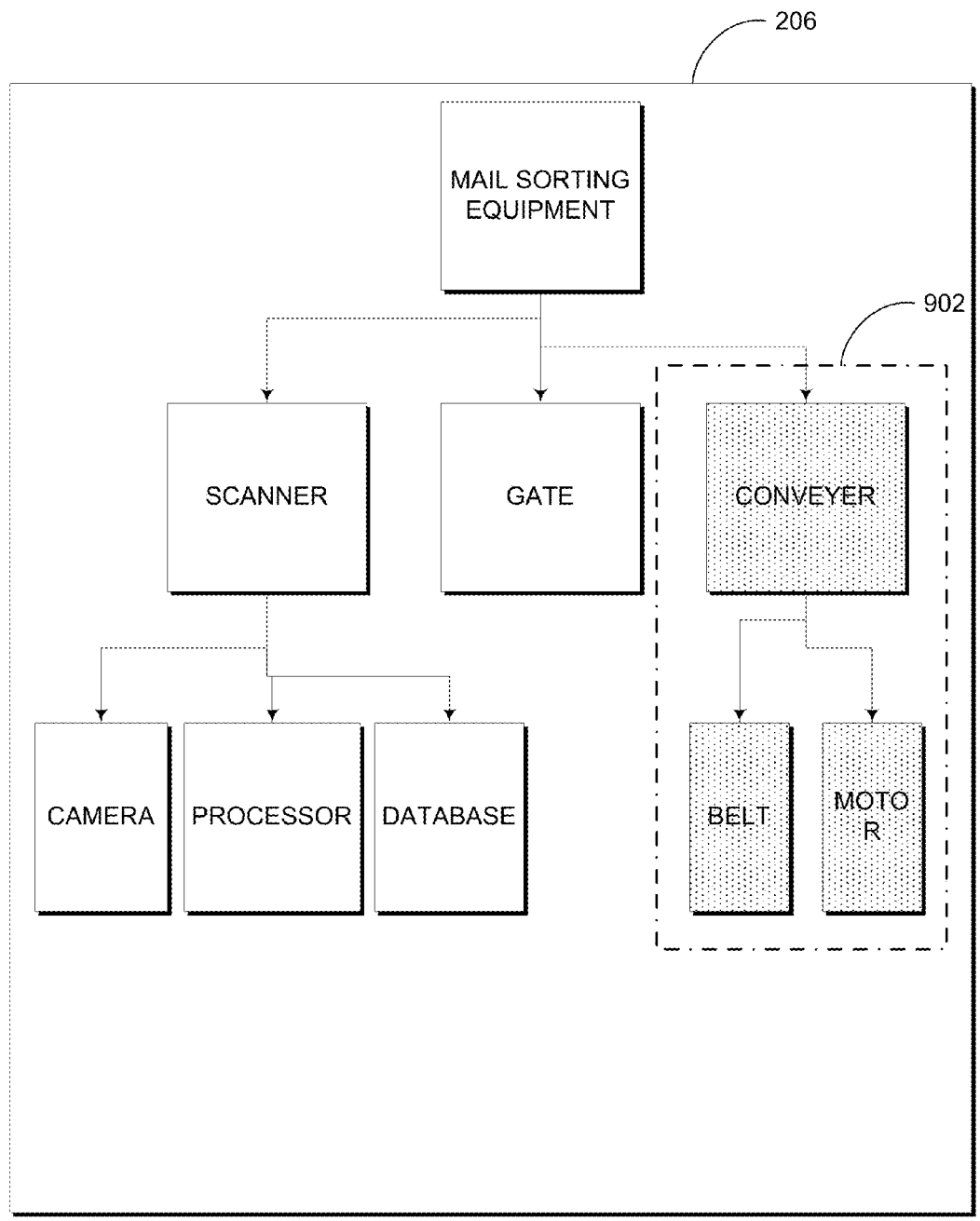
FIG. 9 is a screenshot of one embodiment of a user interface for displaying an equipment maintenance tree.

FIG. 9 is a screenshot of one embodiment of a user interface produced by the equipment estimation system 106 and displayed on the screen 206. FIG. 9 further illustrates the block 708 of FIG. 7. The selected portion 902 may be selected by using input device 202. The screen 206 shows selected portion 902 selected.

Figure 10:
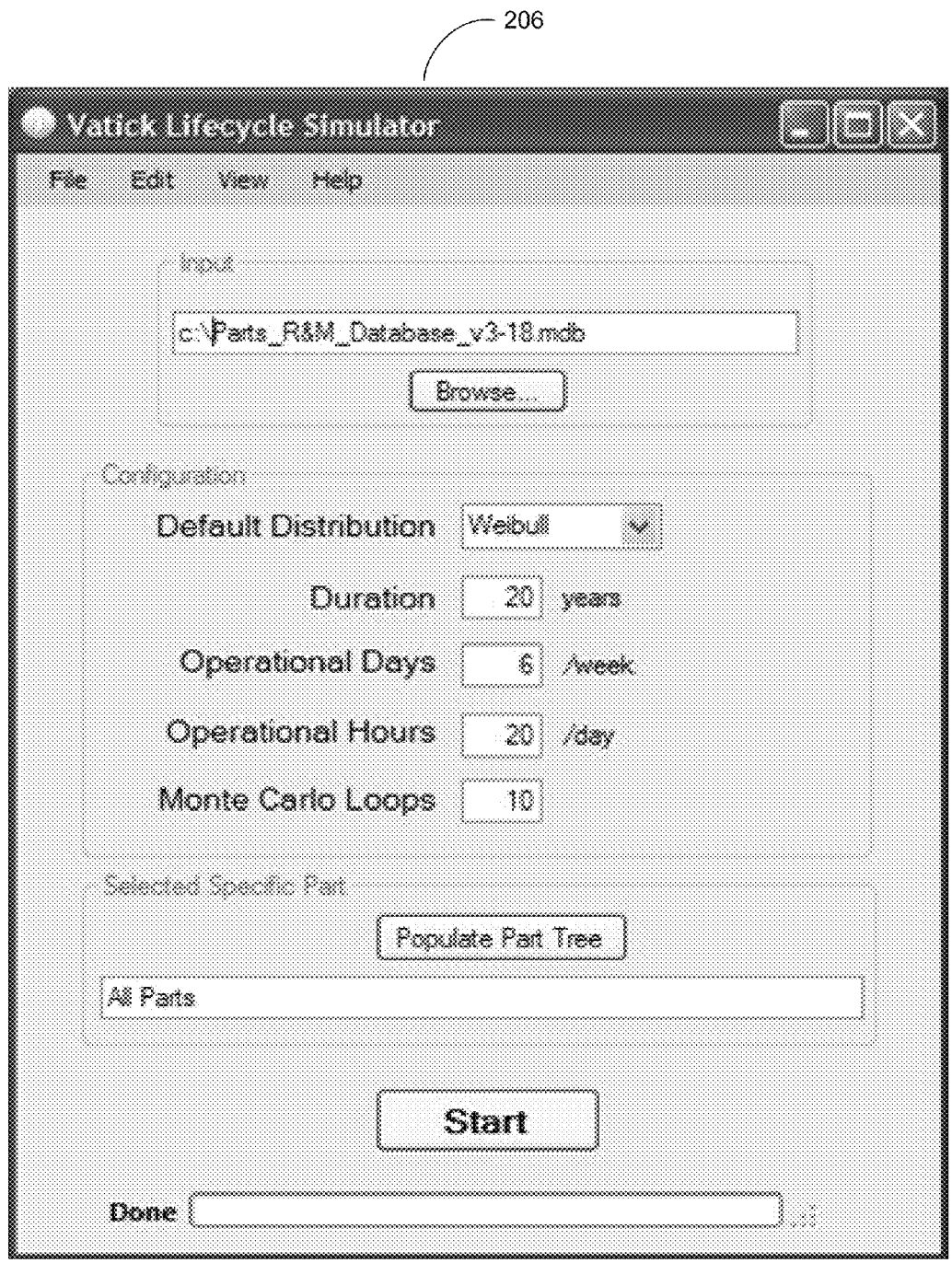
FIG. 10 is a screenshot of one embodiment of a user interface for receiving information about equipment maintenance.

FIG. 10 is a screenshot of one embodiment of a user interface produced by the equipment estimation system 106 and displayed on the screen 206. FIG. 10 further illustrates the block 710 of FIG. 7. In one embodiment, the equipment maintenance system 106 displays a user interface to receive input of a default statistical method. For example, in FIG. 10, the screen 206 shows a Weibull statistical model chosen as the default failure algorithm. Other statistical models include a normal or random distribution. In addition, the screen 206 shows input fields for the default number of operational days and hours for equipment.

Figure 11:
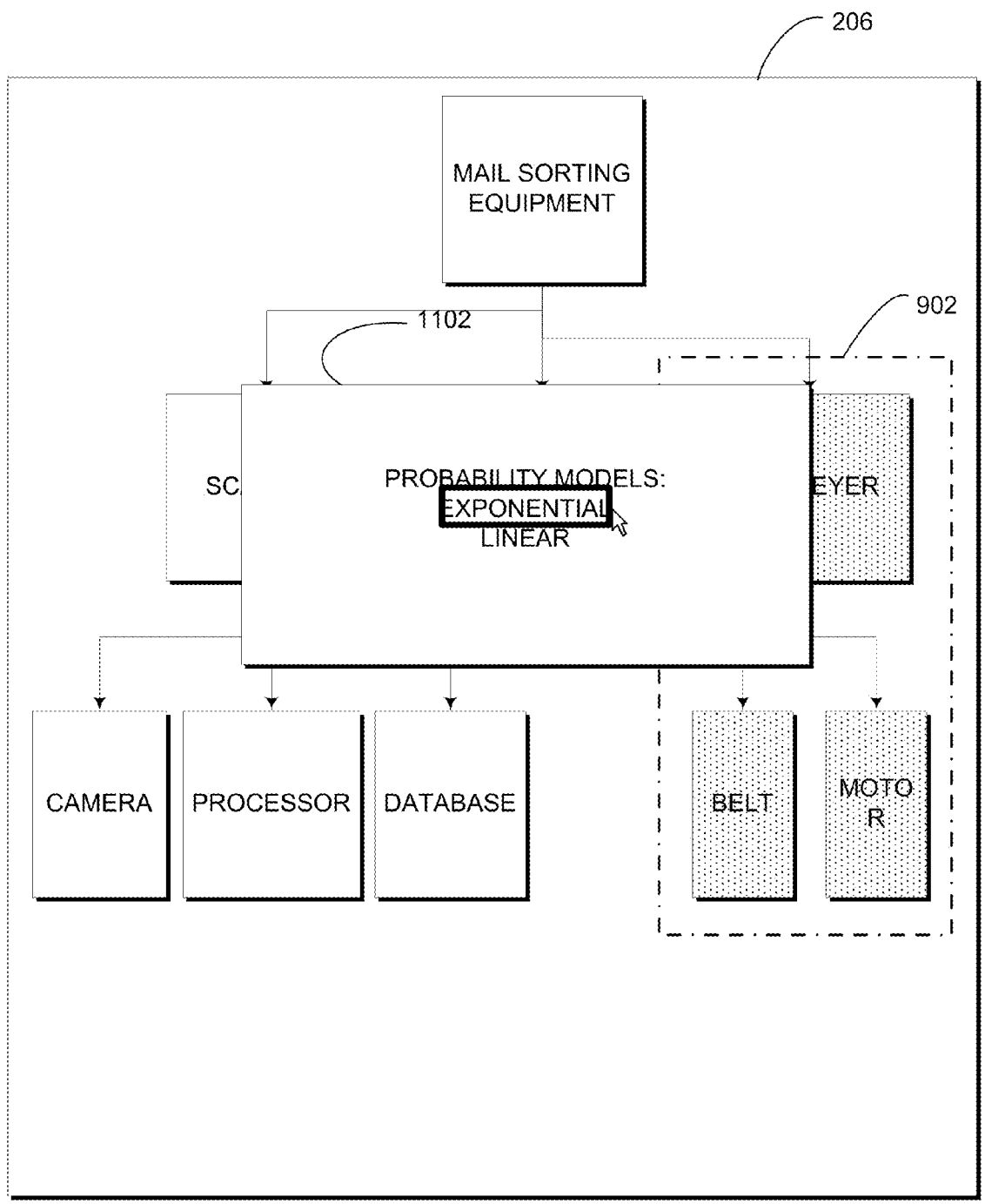
FIG. 11 is a screenshot of one embodiment of a user interface for displaying an equipment maintenance tree.

FIG. 11 is a screenshot of one embodiment of a user interface produced by the equipment estimation system 106 to be displayed on the screen 206. FIG. 11 further illustrates the block 710 of FIG. 7. Screen 206 shows statistical model menu 802 with the exponential model selected to be applied to the selected portion 902. In one embodiment, the equipment maintenance system 106 generates a user interface for receiving a different statistical model for a portion of the equipment tree. For example, a default statistical model can be applied as a default, and a different statistical model can be applied to portions of the equipment tree.

Figure 12:
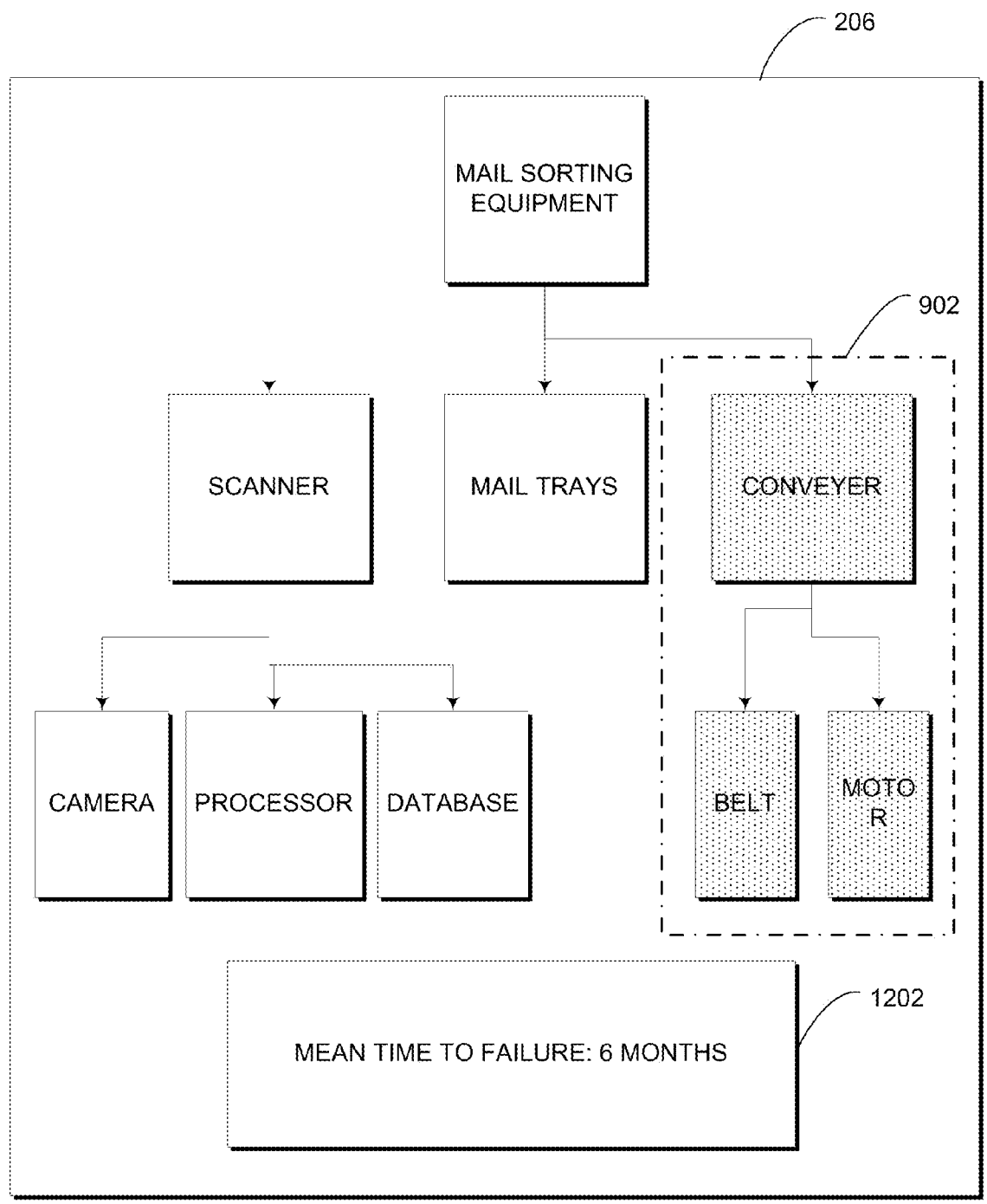
FIG. 12 is a screenshot of one embodiment of a user interface for displaying an equipment maintenance tree.

FIG. 12 is a screenshot of one embodiment of a user interface produced by an equipment maintenance system 106 to be displayed on the screen 206. FIG. 12 further illustrates the block 712 of FIG. 7. Screen 206 shows an interface item 1202 with an estimated time to failure of 2 years for the selected portion 902.

In one embodiment, the equipment maintenance system 106 aggregates equipment maintenance information. In another embodiment, the equipment maintenance system 106 displays reports for conveying information about aggregate equipment maintenance information. In one embodiment, the equipment maintenance system 106 determines the maintenance cost for each piece of equipment and its components. The equipment maintenance system 106 may predict the maintenance cost for each piece of equipment, and the equipment maintenance system 106 displays the maintenance cost for a equipment tree node or subtree. In one embodiment, the equipment maintenance system 106 separates the cost into the labor cost and the parts cost. In one embodiment, the equipment maintenance system 106 receives user input assigning categories for labor costs. For example, the labor costs for one type of equipment may be higher than the labor cost for another type of equipment.

Figure 13:
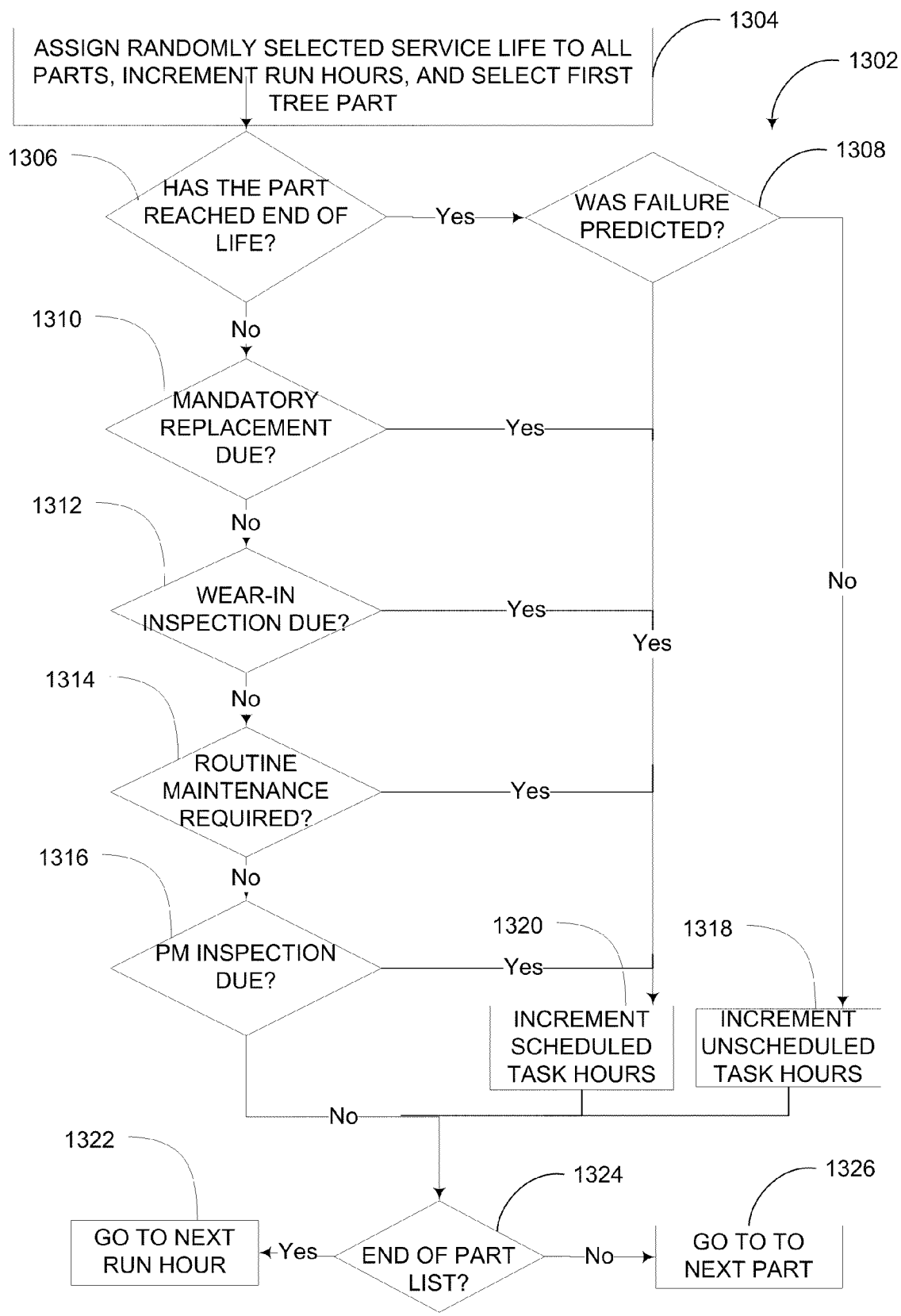
FIG. 13 is a flow chart illustrating one embodiment of a method for tracking equipment maintenance.

FIG. 13 is a flow chart illustrating one embodiment of a method 1302 for tracking equipment maintenance. Beginning at a block 1306, the equipment maintenance system 106 assigns a randomly selected service life to all equipment parts, increments the run hours for the equipment, and selects the first tree part. The first tree part may be the top level node or a lower level node representing a subset of the equipment system.

Continuing to a block 1306, the equipment maintenance system 106 determines whether the selected part has reached the end of its life. If so, the part may be replaced, and the equipment maintenance system 106 assigns a service life to the new part. The equipment maintenance system 106 may determine the cost for the replacement and may also process any collateral damage items, such as items that must also be replaced due to the new part.

Moving to a block 1308, the equipment maintenance system 106 determines whether the equipment failure was predicted.

The equipment maintenance system 106 may determine whether a maintenance event was scheduled or unscheduled. This information may be useful because an organization may want to determine how many unexpected maintenance events occurred. The equipment maintenance system 106 may then determine the amount of time a piece of equipment is expected to be out of service due to scheduled maintenance and the amount of time a piece of equipment was out of service due to unscheduled maintenance. The predicted scheduled maintenance schedule may be helpful so that a manager can predict when more people will need to be hired or scheduled for maintenance activities. The predicted scheduled maintenance may also be helpful for budgeting purposes If the equipment part failure was predicted, preceding to a block 1302, the equipment maintenance system 106 increments the number of scheduled task hours. The equipment maintenance system 106 may increment the number of scheduled labor hours for fixing the equipment part and the cost of fixing the equipment part. If the equipment failure was not predicted, moving to a block 1318, the equipment maintenance system increments the unscheduled task hours, such as the hours to replace it and the hours the equipment was not in use due to the replacement. The equipment maintenance system 106 may also calculate the cost of replacing the equipment part due to the unpredicted failure.

Continuing to a block 1310, the equipment maintenance system 106 determines whether a mandatory replacement of the equipment part is due. If so, the part is replaced and the equipment maintenance system 106 tracks the cost of the replacement, calculates any unused service life of the equipment part, and assigns a service life to the replacement equipment part. The equipment maintenance system 106 then continues to block 1320 and again increments the scheduled task hours.

Continuing to a block 1312, if a mandatory replacement is not due, the equipment maintenance system 106 determines whether a wear-in inspection is due. If so, the equipment maintenance system 106 tracks the cost of the inspection. Then, moving to block 1320, the equipment maintenance system 106 increments the scheduled task hours.

Moving to a block 1314, the equipment maintenance system 106 determines whether routine maintenance is required. If so, the equipment maintenance system 106 tracks the cost of the routine maintenance. Continuing to a block 1320, the equipment maintenance system 106 increments the scheduled task hours.

If routine maintenance is not required, continuing to a block 1316, the equipment maintenance system 106 determines whether a post maintenance inspection is due. If so, the equipment maintenance system 106 tracks the cost of the post maintenance inspection and increments the scheduled task hours. The equipment maintenance system 106 then determines whether the equipment part will fail before the next inspection and updates the scheduled maintenance accordingly. If the part is not likely to fail, the equipment maintenance system moves to a block 1324.

If the part is likely to fail before the next inspection, the equipment maintenance system 106 determines whether the post maintenance inspection was effective. If the inspection was effective, the equipment maintenance system moves to the block 1324. If the inspection was not effective, the part is replaced and the equipment maintenance system 106 tracks the cost and assigns a service life to the new equipment part.

Continuing to a block 1324, the equipment maintenance system 106 determines whether it has gone through each part in the selected portion of the equipment tree. If not, moving to a block 1326, the equipment maintenance system follows the same process with the next part. If the equipment maintenance system 106 has looped through all of the selected equipment parts, the equipment maintenance system 106 moves to the next equipment run hour and continues the process for all of the selected equipment parts.

Figure 14:
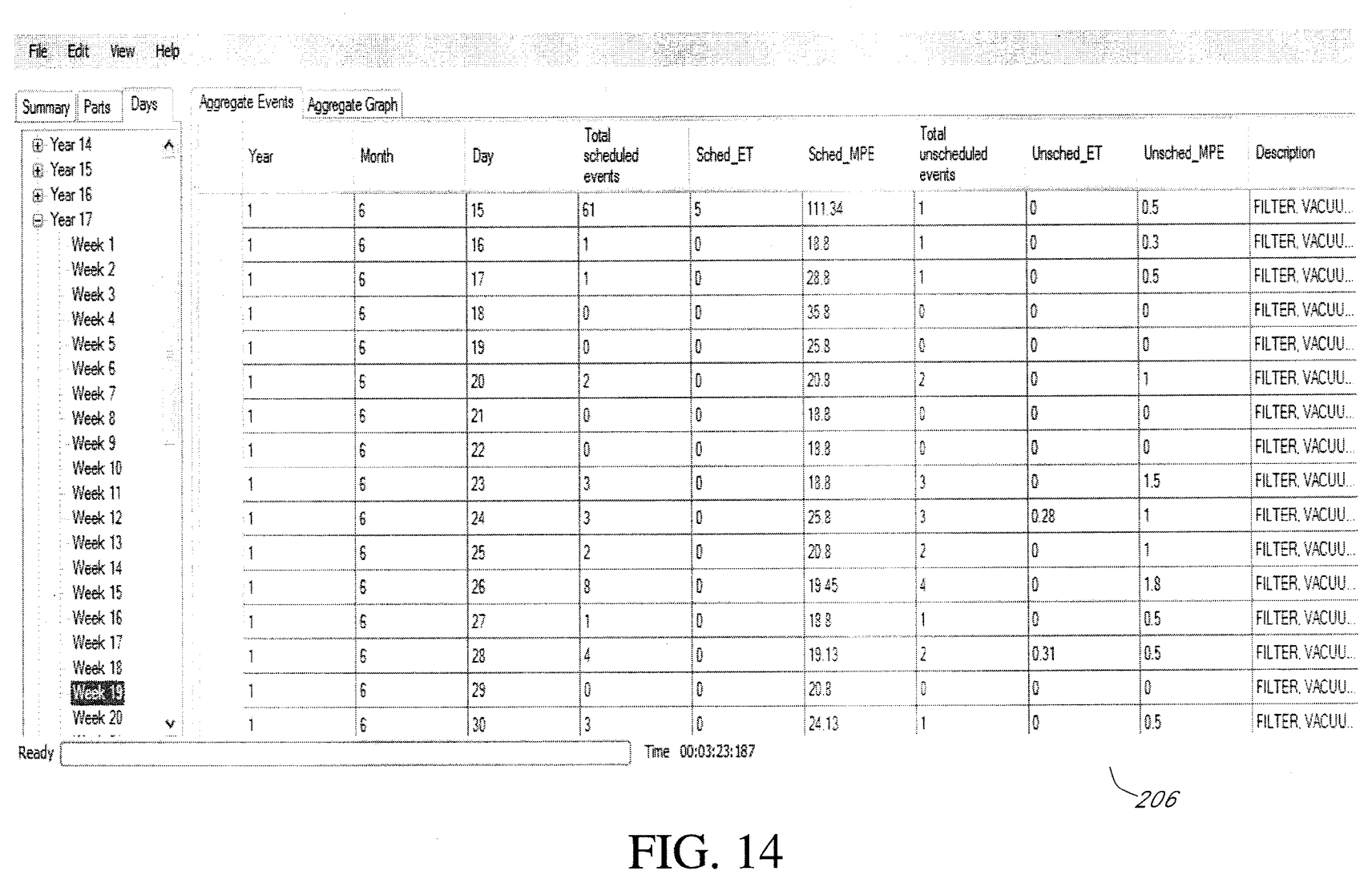

FIG. 14 is a screen shot illustrating one embodiment of a user interface produced by the equipment maintenance system 106 to be displayed on the screen 206. The screen 206 shows aggregate maintenance events that occurred during a particular week. The maintenance events are broken down by the total number of scheduled and unscheduled events. The screen has an equipment tree structure that may be used such that the aggregate events can be viewed for an entire equipment tree, an equipment tree node, or a portion of the equipment tree.

Figure 15:
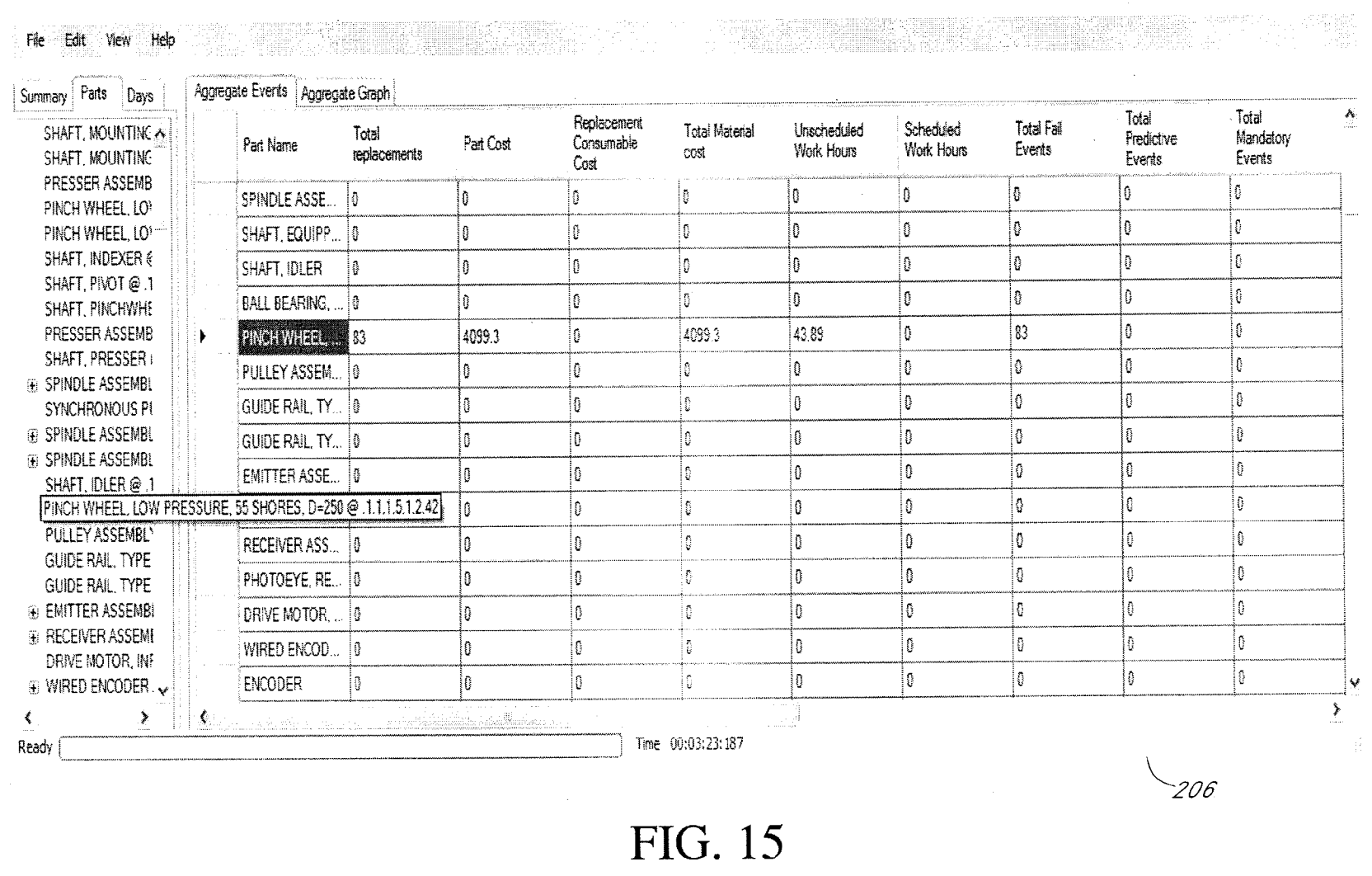

FIG. 15 is a screen shot illustrating one embodiment of a user interface produced by the equipment maintenance system 106 to be displayed on the screen 206. The screen 206 shows aggregate maintenance events that occurred for a particular equipment component or a portion of an equipment tree. The maintenance events are broken down by the total number of scheduled and unscheduled events. The screen 206 shows that a user can select a piece of equipment or the user may expand the list to select a component of a piece of equipment.

Figure 16:
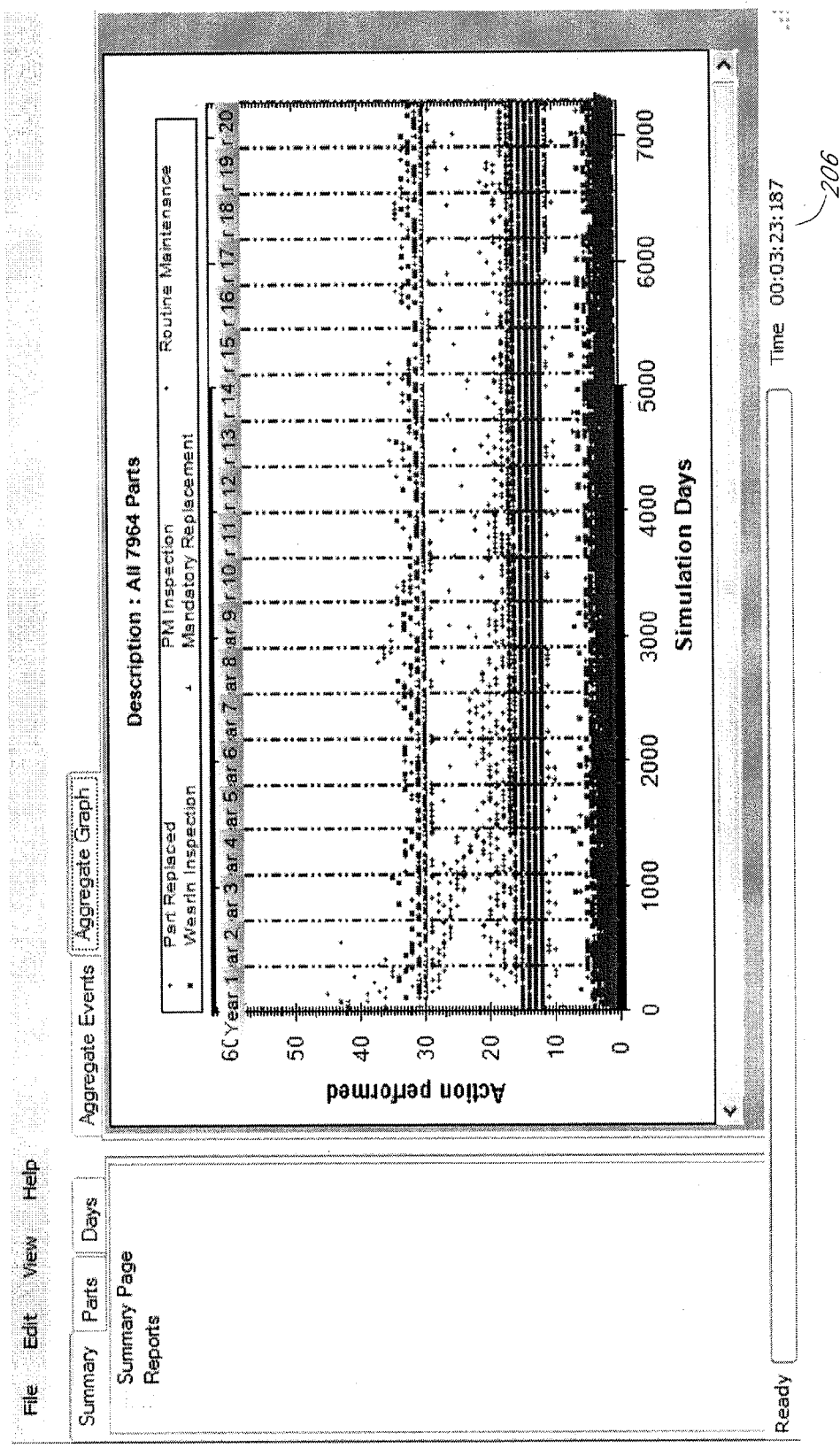
FIG. 16 is a screen shot illustrating one embodiment of a user interface for displaying equipment maintenance information.

FIG. 16 is a screen shot illustrating one embodiment of a user interface produced by the equipment maintenance system 106 to be displayed on the screen 206. The screen 206 shows a graph displaying a summary of the maintenance events occurring for each year in the future. This type of interface may be useful for business planning.

In view of the above, one will appreciate that the invention overcomes the problem of manually determining when equipment and components of equipment in a complex system require maintenance or repair.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A computer-implemented method for displaying equipment failure estimation information comprising:
  receiving information relating to maintenance of a plurality of components of at least one item of equipment;
  generating, using a processor, display data indicative of a tree representation of the components;
  receiving data indicative of a selection of a portion of the tree representation;
  receiving an assignment of a statistical model to at least one of the components corresponding to the selected portion of the tree representation, wherein the statistical model is a linear statistical model, exponential statistical model, or Weibull statistical model, normal distribution, or random distribution; and
  estimating, using a processor, equipment maintenance information associated with at least the selected portion of the components based on the assigned statistical model.

2. The method of claim 1, further comprising displaying the display data indicative of the tree representation of the components on a display device.

3. The method of claim 1, further comprising displaying the estimated equipment maintenance information.

4. The method of claim 1, further comprising receiving assignment of a different statistical model for separate portions of the tree representation.

5. The method of claim 1, further comprising estimating equipment maintenance information associated with the selected and non-selected portions of the tree representation.

6. The method of claim 1, wherein the equipment maintenance information comprises at least one of mean time to failure of the equipment, mean time to repair the equipment, maintenance cost of the equipment, or intervals for scheduled maintenance of the equipment.

7. The method of claim 1, wherein receiving information relating to maintenance of a plurality of components of at least one item of equipment comprises:
  receiving equipment data in XML format;
  receiving an XSLT selection;

transforming the received data based on the selected XSLT into another XML format; and
outputting the data in the transformed XML format.

8. The method of claim 1, wherein generating display data indicative of a tree representation of the components comprises converting the received information into scalable vector graphics.

9. The method of claim 1, wherein receiving data indicative of a selection of a portion of the tree representation comprises receiving at least one of a selection of a single tree component, a collection of tree components, or a sub-tree.

10. The method of claim 1, further comprising determining a maintenance schedule for the equipment represented by data indicative of a selection of a portion of the tree representation based on the estimated equipment maintenance information.

11. The method of claim 10, further comprising generating display data for displaying the maintenance schedule.

12. The method of claim 1, further comprising storing the estimated equipment maintenance information in a non-transitory storage medium.

13. The method of claim 1, further comprising:
receiving information about preferred settings for the display data; and
displaying the future maintenance information according to the received information.

14. The method of claim 13, wherein the received information includes information about paper size, tree depth, and tree layout.

15. The method of claim 1, wherein the data indicative of a selection of a portion of the tree representation comprises user input data.

16. A system for displaying equipment failure estimation information comprising:
a processor configured to:
receive information relating to maintenance of a plurality of components of at least one item of equipment;
generate display data indicative of a tree representation of the components;
receive data indicative of a selection of a portion of the tree representation;
receive an assignment of a statistical model to at least one of the components corresponding to the selected portion of the tree representation, wherein the statistical model is a linear statistical model, exponential statistical model, or Weibull statistical model, normal distribution or random distribution; and
estimate equipment maintenance information associated with at least the selected portion of the components based on the assigned statistical model.

17. The system of claim 16, further comprising displaying the display data indicative of the tree representation of the components on a display device.

18. The system of claim 16, further comprising displaying the estimated equipment maintenance information.

19. The system of claim 16, further comprising receiving assignment of a different statistical model for separate portions of the tree representation.

20. The system of claim 16, further comprising estimating equipment maintenance information associated with the selected and non-selected portions of the tree representation.

21. The system of claim 16, wherein the equipment maintenance information comprises at least one of mean time to failure of the equipment, mean time to repair the equipment, maintenance cost of the equipment, or intervals for scheduled maintenance of the equipment.

22. The system of claim 16, wherein receiving information relating to maintenance of a plurality of components of at least one item of equipment comprises:
receiving equipment data in XML format;
receiving an XSLT selection;
transforming the received data based on the selected XSLT into another XML format; and
outputting the data in the transformed XML format.

23. The system of claim 16, wherein generating display data indicative of a tree representation of the components comprises converting the received information into scalable vector graphics.

24. The system of claim 16, wherein receiving data indicative of a selection of a portion of the tree representation comprises receiving at least one of a selection of a single tree component, a collection of tree components, or a sub-tree.

25. The system of claim 16, further comprising determining a maintenance schedule for the equipment represented by data indicative of a selection of a portion of the tree representation based on the estimated equipment maintenance information.

26. The method of claim 25, further comprising generating display data for displaying the maintenance schedule.

27. The system of claim 16, further comprising storing the estimated equipment maintenance information in a non-transitory storage medium.

28. The system of claim 16, further comprising:
receiving information about preferred settings for the display data; and
displaying the future maintenance information according to the received information.

29. The method of claim 28, wherein the received information includes information about paper size, tree depth, and tree layout.

30. The system of claim 16, wherein the data indicative of a selection of a portion of the tree representation comprises user input data.

* * * * *

UNITED STATES PATENT AND TRADEMARK OFFICE
CERTIFICATE OF CORRECTION

PATENT NO.         : 8,494,826 B2
APPLICATION NO.    : 12/687016
DATED              : July 23, 2013
INVENTOR(S)        : Richards et al.

Page 1 of 1

It is certified that error appears in the above-identified patent and that said Letters Patent is hereby corrected as shown below:

In the Drawings
Sheet 13 of 16 (FIG. 13) at line 1 (Reference Numeral 1326), Change "TO TO" to --TO--.

In the Specification
In column 12 at line 44, Change "tree" to --tree.--.
In column 14 at line 2, Change "purposes" to --purposes.--.

In the Claims
In column 18 at line 37, In Claim 26, change "method" to --system--.
In column 18 at line 47, In Claim 29, change "method" to --system--.

Signed and Sealed this
Fourth Day of March, 2014

Michelle K. Lee
*Deputy Director of the United States Patent and Trademark Office*